United States Patent [19]

Stafford

[11] Patent Number: 4,709,879
[45] Date of Patent: Dec. 1, 1987

[54] CONTROLLED AIR-FLOW AIRCRAFT CAPABLE OF VERTICAL FLIGHT

[76] Inventor: Lannon F. Stafford, P.O. Box 27752, Tempe, Ariz. 85282

[21] Appl. No.: 935,622

[22] Filed: Nov. 21, 1986

Related U.S. Application Data

[63] Continuation of Ser. No. 726,414, Apr. 24, 1985, abandoned.

[51] Int. Cl.$^4$ .............................................. B64C 23/00
[52] U.S. Cl. .................................. 244/12.1; 244/12.5; 244/12.6; 244/208
[58] Field of Search .................... 244/12.1, 12.5, 12.6, 244/36, 51, 52, 208, 207; 180/116, 117, 120, 128, 130

[56] References Cited

U.S. PATENT DOCUMENTS

| | | | |
|---|---|---|---|
| 2,913,196 | 11/1959 | Cox | 244/12.1 |
| 2,994,493 | 8/1961 | Hartman | 244/36 |
| 3,026,066 | 3/1962 | Coates | 244/2 |
| 3,265,329 | 8/1966 | Postelson | 244/23 R |
| 3,752,417 | 8/1973 | Lagace | 244/52 |
| 3,931,942 | 1/1976 | Alpert | 244/12.1 |

Primary Examiner—Joseph F. Peters, Jr.
Assistant Examiner—Rodney Corl
Attorney, Agent, or Firm—William W. Holloway

[57] ABSTRACT

By controlling the flow of the air over an airfoil, a lifting force can be achieved even in the absence of forward motion by the aircraft. The air flowing over the airfoil is forced into a chamber by a propulsion unit and the air entrapped in the chamber can be recirculated to a forward portion of the airfoil lifting surface, thereby increasing the lifting force of the airfoil. The lifting body has side members associated with the airfoil to channel the air over the airfoil. Outlets from the chamber are provided to direct the flow of air in any lateral direction for assistance with directed motion or for assistance with aircraft stability. Additionally, outlets in the bottom of the aircraft can assist in the vertical force exerted on the aircraft by forced air escaping therefrom.

20 Claims, 5 Drawing Figures

CONTROLLED AIR-FLOW AIRCRAFT CAPABLE OF VERTICAL FLIGHT

This is a continuation of co-pending application Ser. No. 726,414 filed on Apr. 24, 1985, now abandoned.

BACKGROUND OF THE INVENTION

Field of the Invention

This invention relates generally to aircraft and, more particularly, to an aircraft with a controlled flow of air over an airfoil, thereby permitting both vertical takeoffs and landings, as well as vertical and (normal) horizontal flight. The aircraft has passages for redirecting the air flowing over the airfoil to the front of the airfoil and to produce a force in a direction of the desired flight path.

Discussion of the Related Art

In recent years, the increase in the power and efficiency of engines along with the development of lightweight structural materials has provided increased interest and incentive for the practical development of low cost, lightweight personal aircraft. These aircraft have become more inexpensive and more readily available as the improved technology has been applied to the problem.

Notwithstanding the improvements in the newly developed aircraft, these vehicles have been subject to the traditional limitation that the aircraft must develop forward speed relative to air mass before the lifting properties of the airfoil can be utilized. To overcome this problem, aircraft, such as helicopters, have been developed in which the engine and a suitably-oriented propeller provide thrust from the engine literally to drag the aircraft into motion in a vertical direction. Similarly, vertical liftoff aircraft have utilized directed flow of the exhaust of jet engines to produce vertical motion.

However, in the cases of these types of vertical travel aircraft, the apparatus has been complex and expensive, and has attempted to solve the problem of vertical travel through the use of directed force rather than the attempt to utilize the properties of a lifting body. For example, U.S. Pat. No. 3,987,981, "Roll Control For Aircraft, Particularly Flying Barrels, Adapted to be Driven by Means of Ducted Fans," uses louvers or flaps to direct the flow of air from a ducted fan in the opposite direction from the direction of the directed flight pattern. A similar technique is shown for U.S. Pat. No. 2,610,005 "Propulsion Means for Vertical Rising Aircraft." In U.S. Pat. No. 3,901,463 "Lift and Propulsion Means for a Vertical Take-off and Landing Aerodyne" provides two propellers that can simultaneously force air into a partially enclosed chamber, and impart a force in direction opposite to an opening in the chamber. U.S. Pat. No. 2,623,712 "Airplane with Pivotally Mounted Sustaining Wing" provides a wing structure that can be pivoted on a fuselage to provide some measure of control over the flight path. U.S. Pat. No. 2,008,737 "Airplane", discloses a passage in the aircraft so that the force of air against the walls of the passage provide a lifting force for the aircraft. And U.S. Pat. No. 3,017,139, "Ring Airfoil Aircraft" uses flaps to direct the flow of air and provide a lifting force. In each of these examples, the directed air flow is the means of controlling a flight path.

A need has therefore been felt for a simple aircraft configuration that can conveniently and safely move in a vertical direction and that makes use of the properties of the lifting surfaces to provide the requisite vertical force.

SUMMARY OF THE INVENTION

It is therefore an object of the present invention to provide an improved aircraft.

It is a further object of the present invention to provide an aircraft capable of travelling in the vertical direction as well as in the normal horizontal direction.

It is yet another object of the present invention to control the flow of air over one or more airfoils so that a lifting force can be established with respect to the aircraft, the vertical lift being present even in the absence of forward motion relative to the ambient air mass.

It is a more particular object of the present invention to provide a mechanism for controlling the flow of air across an airfoil, the control mechanism including apparatus for directing air to the front (and upper surface) of the airfoil.

It is yet another object of the present invention to direct a flow of air in lateral and downward directions to assist in propulsion of the air craft.

The aforementioned and other objects are accomplished, according to the present invention, by an aircraft having a propeller, ducted fan, turbine inlet or similar engine-driven mechanism located behind the airfoil for forcing air over the lifting surface of the airfoil. Side members coupled to the airfoil are included to channel the flow of air over the airfoil and for reducing the amount of air entering the engine-driven mechanism that does not flow over the lifting foil. The air entering the engine-driven mechanism is forced into a chamber that includes louvers for directing the air to assist in propulsion of the aircraft, and can force the air into a channel that circulates the entrapped air to the front (and upper surface) of the airfoil. The recirculated air flow provides continuous lifting force on the airfoil and can assist in causing the craft to travel in a vertical direction even in the absence of forward motion relative to the ambient air mass. Addtional channels can also be provided for directing entrapped air both downward to increase lift and in all lateral directions with respect to the aircraft and for directing, along with the exit louvers from the chamber, the direction of travel of the aircraft. The air flow through the lateral and downward exiting channels can be used to stabilize the aircraft.

These and other features of the present invention will be understood upon reading of the following description along with the drawings.

BRIEF DESCRIPTION OF THE DRAWINGS

FIG. 1 is a perspective view with cut-away portion to demonstrate the structure of the aircraft of the present invention.

OPERATION OF THE PREFERRED EMBODIMENT

Detailed Description of the Drawings

Figure 2:
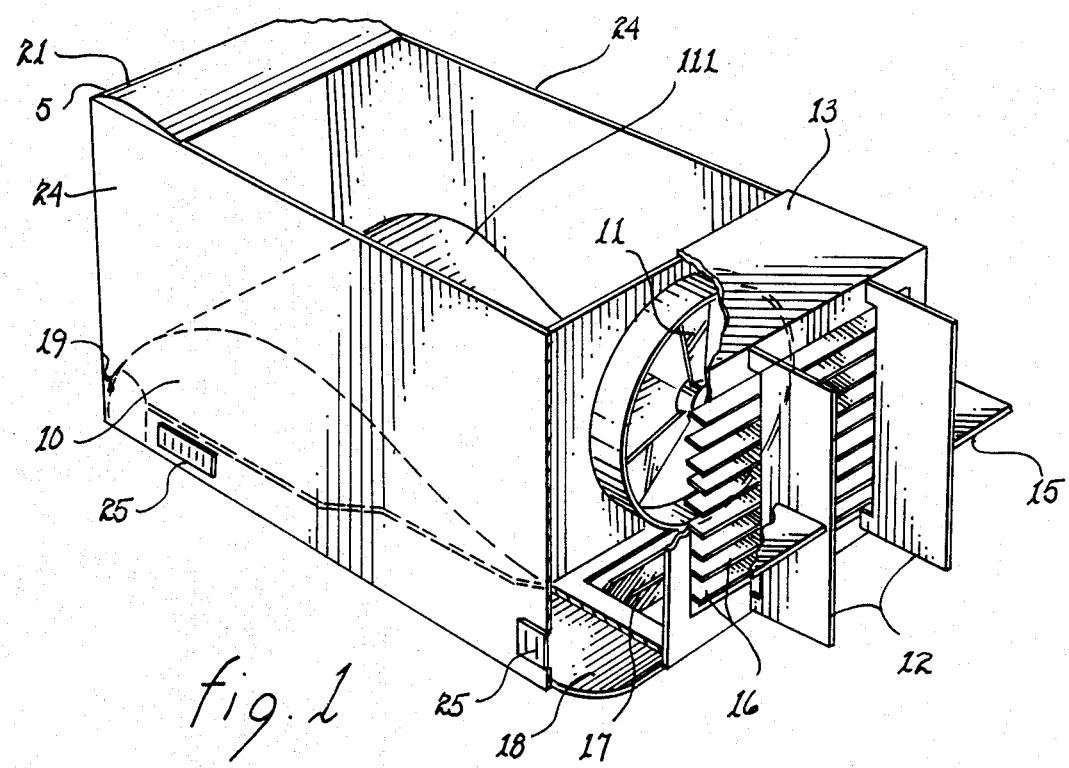
FIG. 2 is a cross-sectional view of the aircraft of the present invention.
Figure 2:
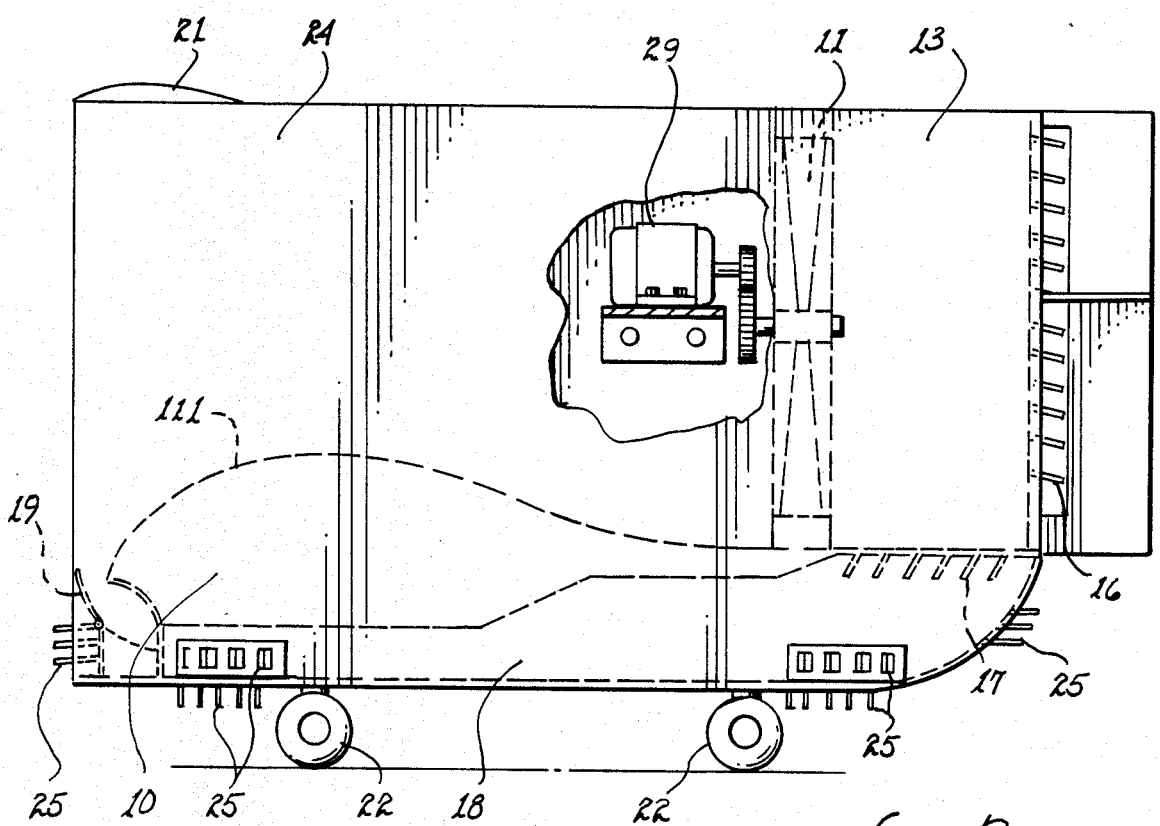

Referring now to FIG. 1, an airfoil 10 provides a geometry for producing a lifting force when the flow of air passes over the lifting surface 111. Propulsion unit 11 pulls the air over the surface 111 of the airfoil. The propulsion unit is, in the preferred embodiment, a ducted fan sealed on all sides to prevent the return flow of air through the duct containing the fan. The propulsion unit is driven by an engine 29, not shown in FIG. 1. The chamber 13 into which the air is forced by the propulsion unit 11 includes two sets of louvers in the preferred embodiment. The first set of louvers 16 permits air to flow in a backward direction and can assist in a forward motion of the aircraft 5. Associated with the louvers 16 can be rudders 12 and elevators 15 for additional control of the forward flight path. The louvers 16 can also act as rudders when appropriately positioned and controlled. Louvers 17 provide a controllable entrance to a plenum or channel 18 that can direct the flow of air beneath the airfoil. The channel has an exit opening in an area in front of the lifting surface 111 of the airfoil at surface member 19 and can include exit ports or outlets 25 on the sides, the front, the rear and the bottom of the aircraft. The air from the chamber 13 and plenum 18 can be recirculated, exiting in front of the airfoil surface 111 at member 19, member 19 providing a controllable exit of the flow of recirculated air. To prevent air from being drawn away from or drawn into an intermediate portion of the airfoil, the side members 24 are provided along the edge of the airfoil. These side members 24 can control the flow of air and increase the lifting efficiency. One or more auxiliary airfoils 21 can also be provided that helps guide the aircraft in the forward direction, while at the same time providing additional lift during forward travel by the aircraft. Wheels 22 (not shown in FIG. 1) are available for motion on the ground. The channel 18 at the bottom of the aircraft can serve as a floatation device.

Referring next to FIG. 2, a cross-section of the aircraft is shown. Again, the airfoil 10, the propulsion unit 11 and louvers 16 and 17, and air chamber 13 into which the air from the propulsion unit is forced are shown. The air is forced through the louvers 17 in the bottom of the plenum or chanel 18. The passage associated with channel 18 is shown for directing the air to a surface member 19. The auxiliary airfoil 21 is shown coupled to the side members 24. The air flow outlets 25 for additional propulsion and stability of the aircraft are shown. The bottom of the aircraft is coupled to wheels 22 for motion while on the ground. Engine 29 is shown in one possible position for supplying power of the propulsion unit.

Figure 3:
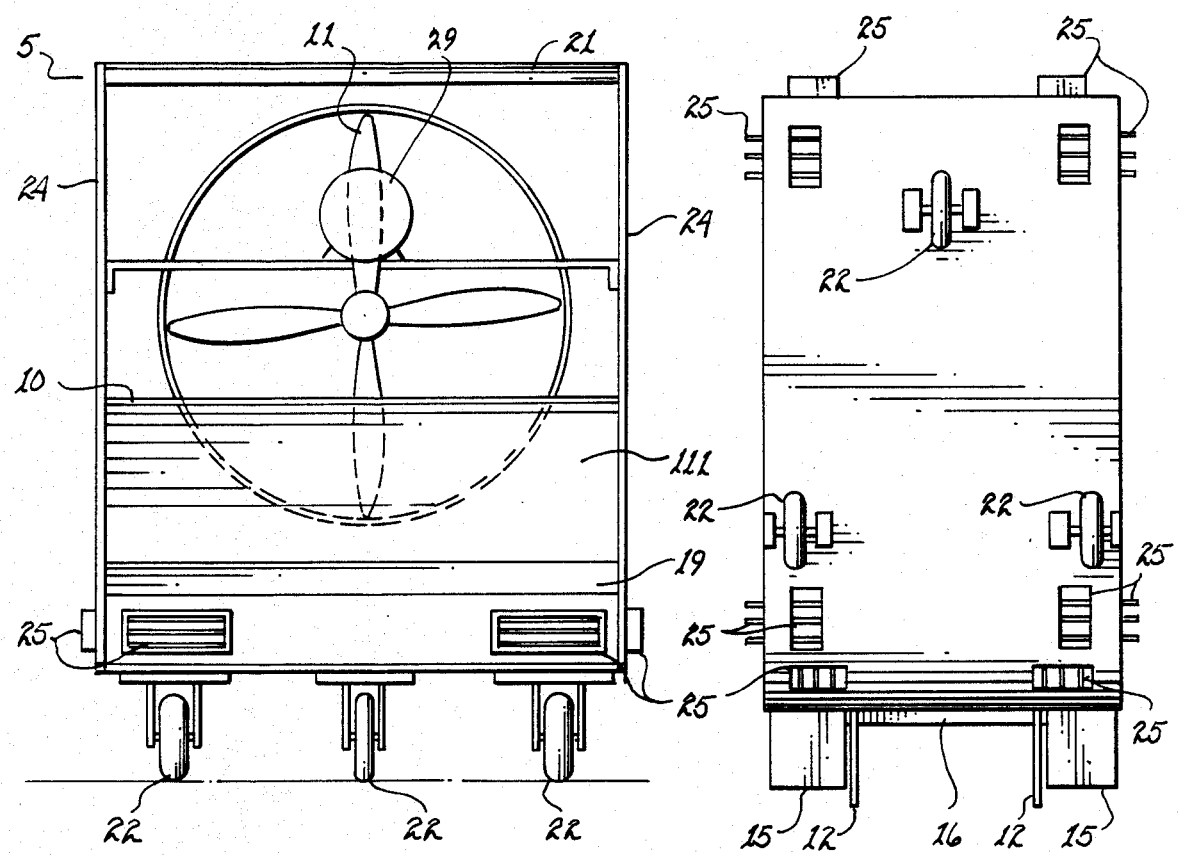
FIG. 3 is a front view of the aircraft on the present invention.

Referring next to FIG. 3, a front view of the aircraft 5 is shown. The lifting surface 111 of the airfoil 10 provides a contour for providing upward force when air flows over the surface. The outlets 25 provide a directional flow of air from chamber 18. The surface 19, at the leading edge of the airfoil, directs air from the storage chamber 13 and channel 18 along the surface of airfoil 19 to increase the flow of air over surface 111. The air is drawn by propulsion unit 11, powered by engine 29, over the surface 111 of the airfoil 10. The side members 24 confine the flow of air generally over the airfoil. Wheels 22 support the aircraft on the ground. Auxiliary airfoil 21 can provide additional lift during forward flight.

Figure 4:
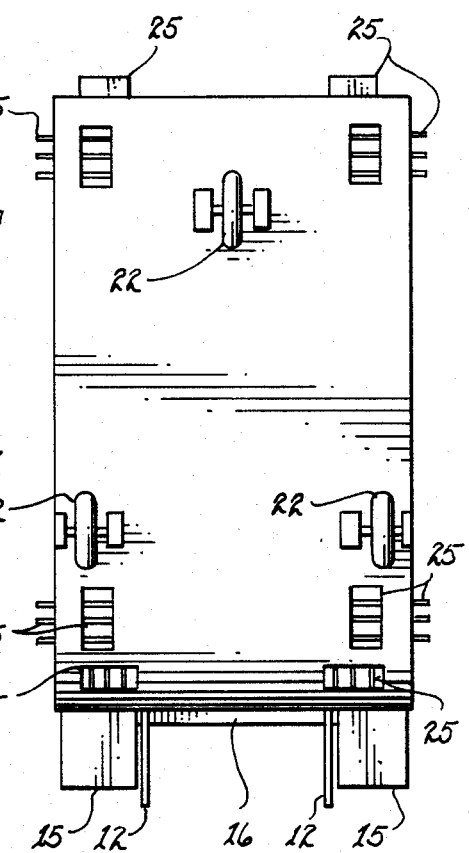
FIG. 4 is a bottom view of the aircraft of the present invention.

Referring next to FIG. 4, a bottom view of the aircraft of the instant invention is shown. The outlet or exit ports 25 are shown. These ports can assist in the flight or can be used to stabilize the aircraft. The wheels 22 provide mobility for the aircraft while on the ground, the elevation 15, louvers 16 and rudders 12 are also visible.

Figure 5:
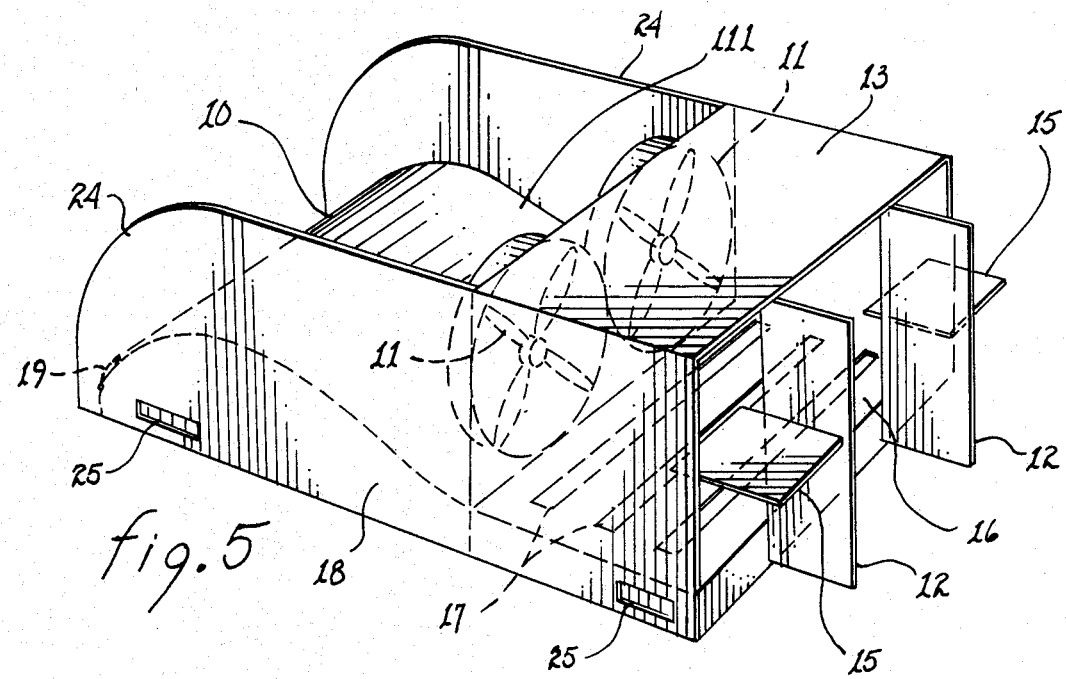
FIG. 5 is a perspective view of an aircraft having a plurality of propulsion units according to the present invention.

Referring next to FIG. 5, a multi-propulsion unit version of the aircraft according to the instant invention is shown. In this embodiment the airfoil 10 is coupled to the two side members 24. A plurality of propulsion units 11 force the flow of air over the surface 111 of the airfoil 10 and into chamber 13. Louvers 16 permit the exit of air to the rear of the aircraft and past the control surfaces of the elevator 15 and the rudders 12. The louvers 16 permit the flow of air from chamber 13 into plenum or channel 18 and subsequently to the front of airfoil 10 via surface member 19 or out of the exit ports 25. One or more auxiliary airfoils (not shown) can also be present for additional guidance or lifting force during vertical flight.

Operation of the Preferred Embodiment

The operation of the aircraft depends on the air being constrained to flow over the airfoil and forced into chamber 13. In chamber 13, the air can be recirculated to one or more exit surfaces 19 in front of the airfoil and/or can be exited from outlets 25 on the bottom and lateral surfaces of the aircraft. Thus, even when standing still, a flow of air over the airfoil is maintained and this flow can be sufficient to cause the lifting action or vertical motion of the aircraft. The air flow can also be directed in any lateral or downward direction by the exit ports to provide additional upward vertical force and can assist in motion (in any direction) of the aircraft. A rudder and elevator system can be associated with rear louvers to provide for increased maneuvering ability when the louvers are opened. One or more auxiliary airfoils can be coupled to the side members of the aircraft. The side members increase the flow of air over the airfoil for additional lift when sufficient forward motion is achieved.

In preparation for take-off from a confined area, the louvers 16 would normally be closed and the flow of air over the airfoil and captured by chamber 13 would be directed to the exit at the front of the airfoil formed by member 19 and to the exit ports 25 in the bottom of the aircraft. Any lateral flow of air from the exit ports would generally be for the purpose of stability of the aircraft as would any imbalance in the flow of air from the plurality of exit ports 25 in the bottom of the aircraft. Once obstacles have been cleared, the louvers 16 can be opened and a transition made to the more normal mode of flight in which the relative motion of the aircraft through the ambient air mass provides a sustaining lifting force. In addition, the motion of air flow past the louvers 16, not only lowers resistance as compared to the closed position of the louvers, but enhances the effect of the rudder and control surfaces. In this configuration, when no air is being introduced to the front of the airfoils, member 19 becomes part of the airfoil surface 111. As the transition to the landing configuration is made, louvers 16 are closed and the increase in pressure in chamber 13 can be transmitted to channel (or plenum) 18. From channel 18, the flow of air can be recirculated over the airfoil for additional lift, can be exited in any lateral direction for motion or stability and can be exited from the ports in the bottom of the aircraft for additional vertical force and for stability.

In the preferred embodiment, only one channel 18 is shown. In this embodiment, the control structure would be extensively associated with each port and the amount of air permitted to exit from each port would be a function of the opening of the port. However, it will be clear that a plurality of channels, each with associated louvers, can provide an additional mechanism for control and reduce the interrelationship between the ports and surface 19 that exists when only one channel is used.

The operator of the aircraft and the control mechanisms can be located in the interior of the airfoil when appropriate facilities are provided to permit the operator to view the surrounding environment. If the airfoil is not large enough to accommodate an operator, a canopy can be added to the airfoil and can be positioned in a manner to minimize the disruption of the flow of air over the surface of the airfoil. Provision must be made for surveillance by the operator.

The foregoing description is intended to illustrate the operation of the preferred embodiment and is not meant to limit the scope of the invention. The scope of the invention is to be limited only by the following claims. From the above description, many variations will be apparent to one skilled in the art that would yet be emcompassed by the spirit and scope of the invention.

What is claimed is:

1. An aircraft capable of hovering and vertical flight comprising:
   an airfoil;
   a propulsion unit causing forced air flow over said airfoil;
   an air chamber coupled to said propulsion unit, said propulsion unit causing air from said forced air flow to enter said chamber;
   at least one passage for releasing air in said chamber along a forward portion of said airfoil; and
   side members coupled to said airfoil, said side members positioned to confine said forced air flow over said airfoil, said side members extending at least from said propulsion unit to said forward airfoil portion, said propulsion unit and said side members controlling a flow of air over said airfoil, said forced air flow causing a lifting force capable of providing said hovering and vertical flight.

2. The aircraft of claim 1 further including an auxiliary airfoil, said auxiliary airfoil positioned above and generally parallel to said airfoil to provide a vertical component of lift during said vertical and hovering flight.

3. The aircraft of claim 1 wherein said propulsion unit is oriented with respect to said airfoil to provide said forced air flow entering said propulsion unit with in a direction generally perpendicular to a lift direction of said airfoil.

4. The aircraft of claim 1 wherein said propulsion unit extends above said airfoil when said aircraft is oriented horizontally, said side members extending generally to a height of said propulsion unit.

5. The aircraft of claim 1 wherein air can flow through said chamber when said aircraft is operating in a typical power flight mode.

6. The method of providing a lifting force for an aircraft capable of providing vertical and hovering flight comprising the steps of:
   causing a forced flow of air over at least one airfoil of said aircraft by means of a propulsion unit;
   recirculating at least a portion of said air flow over said airfoil; and
   constraining said forced flow of air over said airfoil by side members coupled to said airfoil, said side members extending along said airfoil between said propulsion unit and a location on said airfoil where recirculated air is released, said propulsion unit and said side members controlling a flow of air over said airfoil, said forced flow of air providing said lifting force for vertical and hovering flight.

7. The method of providing a lifting force for an aircraft of claim 6 further comprising the step of orienting said propulsion unit so that said forced flow of air entering said propulsion unit is generally perpendicular to a lift direction of said airfoil.

8. The method of providing a lifting force for an aircraft of claim 7 wherein said propulsion unit extends above said airfoil when said lift direction is generally vertical, said side members generally extending at least to a height of said propulsion unit.

9. The method of providing a lifting force for an aircraft of claim 8 further comprising the step of causing air from said forced flow of air to be stored in a chamber, said chamber including passages to a forward portion of said airfoil.

10. The method of providing a lifting force for an aircraft of claim 9 further comprising the step of controlling a direction of said aircraft by means of ports releasing said stored air in a direction opposite to a desired aircraft movement.

11. The method of providing a lifting force for an aircraft of claim 10 further comprising the step of coupling multiple propulsion units to said airfoil for enhancing a flow of air over said airfoil.

12. An aircraft capable of vertical and hovering flight comprising:
   airfoil means;
   propulsion means for forcing an air flow over said airfoil means;
   chamber means coupled to said propulsion means for entrapping said air flow passing through said propulsion unit;
   recirculating means coupled to said chamber means for releasing at least a portion of air entrapped in said chamber means along a forward upper surface of said airfoil means; and
   side member means coupled to said airfoil means, wherein said side member means extend from a vicinity of said propulsion means to at least said forward upper surface, said side member means and said propulsion means in conjunction with said recirculating means providing a controlled air flow over said airfoil means, said controlled air flow capable of providing a lifting force resulting in vertical and hovering flight of said aircraft.

13. The vertical flight aricraft of claim 12 further including exit port means coupled to said chamber means for controllably releasing directed airflow from said aircraft.

14. The vertical flight aircraft of claim 12 wherein said propulsion means is oriented to provide a direction of said air flow perpendicular to a lift direction of said airfoil means.

15. The vertical flight aircraft of claim 14 wherein said propulsion means extends above said airfoil means in said lift direction, said side member means extending at least to a height of said propulsion means in said lift direction.

16. The vertical flight aircraft of claim 12 further including flight means for permitting said aircraft to operate in a typical powered flight mode in which motion of said airfoil means relative to an ambient air mass produces a lifting force.

17. The vertical flight aircraft of claim 16 wherein said flight means includes louvers in a rear of said chamber means for permitting said air flow to pass through said chamber means.

18. The vertical flight aircraft of claim 17 further comprising elevator means and rudder means positioned proximate to said louvers for controlling said aircraft in said typical powered flight mode.

19. The vertical flight aircraft of claim 12 further including at least one auxiliary airfoil coupled to a forward position of said side member means to provide an additional lifting force in response to said air flow, said auxiliary airfoil being positioned above and generally parallel to said airfoil means.

20. The vertical flight aircraft of claim 12 further including at least one additional propulsion means.

* * * * *